PACKAGING TECHNIQUE FOR MICROELECTRONIC CIRCUITS

Filed July 19, 1962

2 Sheets-Sheet 1

INVENTORS
JOHN C. MOULD
& YAOHAN CHU
BY Hurvitz & Rose
ATTORNEYS

PACKAGING TECHNIQUE FOR MICROELECTRONIC CIRCUITS

Filed July 19, 1962

2 Sheets-Sheet 2

INVENTORS
JOHN C. MOULD
& YAOHAN CHU

BY Hurvitz & Rose

ATTORNEYS

United States Patent Office 3,187,227

Patented June 1, 1965

3,187,227

PACKAGING TECHNIQUE FOR MICRO-ELECTRONIC CIRCUITS

Yaohan Chu, Chevy Chase, Md., and John C. Mould, McLean, Va., assignors to Melpar, Inc., Falls Church, Va., a corporation of Delaware Filed July 19, 1962, Ser. No. 210,990
13 Claims. (Cl. 317—101)

The present invention relates generally to circuit connection systems and more particularly to a system for interconnecting a plurality of circuits located in interchangeable containers, wherein conductors are located on the exterior container surface and contact other conductors that traverse the distance between several containers.

With the advent of microelectronic circuitry, e.g. solid state molecular components and thin film circuitry, the possibility of attaining large data handling systems which require minimum space has seemingly been realized. However, existing connection techniques have not achieved the desired results because they have lacked the flexibility necessary for ease of component substitution due to the necessity for permanent connections through the use of soldered joints, pins, plugs, receptacles and connectors. In consequence, any component malfunction or alteration of system program, requires considerable down time and the deployment of a very competent mechanic so that great expense is incurred.

The present invention obviates these problems by providing a system which employs no loose wires, plugs, pins, receptacles and only a single connector. This result is attained by placing each of the microelectronic circuits in a separate container having mutually insulated conductors located on its exterior surface and connected to the circuit elements. A plurality of these containers are positioned on a surface having a multiplicity of mutually insulated conductors which mate with the conductors on the containers throughout the length of the latter.

To achieve the maximum number of circuit combinations, two sets of orthogonally oriented conductors are provided. One set of conductors is located on the top of each container so that it connects and mates with a first group on conductors which traverse the distance between several containers. The second set of conductors is located on the bottom of each container so that it connects with a second group of conductors which is disposed in a parallel plane to the first conductor group.

When it is desired to replace a circuit, it is merely necessary to change the desired container, a very simple operation since the containers are readily accessible and there are no interconnections between them. In one embodiment, the containers are maintained in fixed position during operation by providing them with wedges which engage grooves in the surfaces carrying the first and second conductor groups. A vacuum chamber is created within the package in which the containers and conductor carrying surfaces are located. Accordingly, the atmosphere exerts sufficient forces on the conductor carrying surfaces to securely fix the wedges in the grooves.

In other embodiments, the vacuum chamber is not necessary since the conductor carrying surfaces are corrugated to mate with corrugated container surfaces and sufficient pressure contact is exerted between adjacent surfaces to maintain the containers in place. In one of these embodiments, the conductor carrying surface corrugation is rectangular so that it mates with a truncated saw tooth container corrugation. The saw tooth surfaces are conductive as are the side walls of the rectangular corrugation. In consequence, the conducting surfaces are cleaned when they slide across each other during container insertion. In another embodiment maxium flexibility of connections is attained through the use of a ribbed corrugation by having the rib conductive side walls adapted to mate with any of the container saw tooth corrugations.

It is accordingly an object of the present invention to provide a new and improved system for interconnecting a plurality of electric circuits.

Another object of the present invention is to provide a system for establishing connections between micro-miniature circuits which may be easily changed when a component malfunction or program change occurs.

An additional object of the present invention is to provide a system for interconnecting micro-miniature circuits without utilizing cumbersome loose wires, pins, plugs, and receptacles.

A further object of the present invention is to provide a system for establishing connections between interchangeable micro-miniature circuits in which conductor contamination is materially obviated by the same mechanism which functions to maintain the circuits in a fixed position.

Still another object of the present invention is to provide a system for establishing circuit connections between diverse micro-miniature circuits, each of which is positioned within separate interchangeable containers having conductors located on their exterior surfaces, wherein these conductors mate with other conductors traversing the distance between several containers.

Yet a further object of the present invention is to provide a system for establishing circuit connections between interchangeable micro-miniature circuits, wherein the circuits are securely maintained in fixed position when in utilization but are changed with minimum effort when desired.

The above and still further objects, features and advantages of the present invention will become apparent upon consideration of the following detailed description of one specific embodiment thereof, especially when taken in conjunction with the accompanying drawings, wherein.

Figure 1:
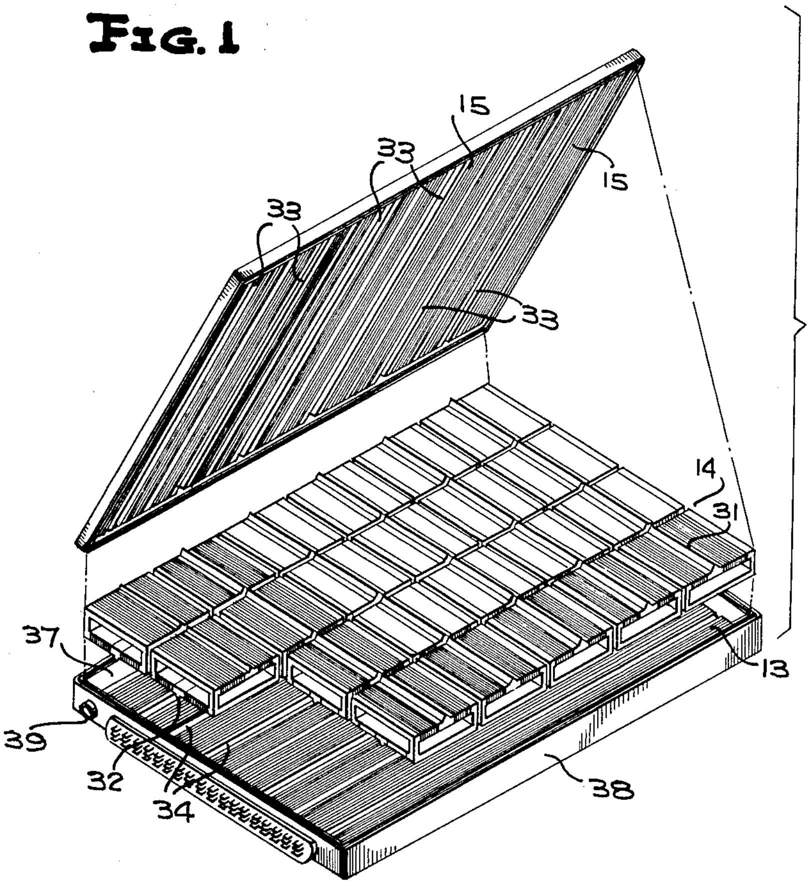
FIGURE 1 is a perspective view of one preferred embodiment of the present invention.

Reference is now made to FIGURE 1 of the drawings, upon which a hollow, rectangular package 11, having parallel top and bottom sides 12 and 13, is illustrated. Side 12 is a cover which is removable from the remainder of package 11 so that right parallelepiped, hollow containers 14 may be easily placed against bottom wall 13. The interiors of the top and bottom walls 12 and 13 are fabricated of an insulating material upon which a plurality of parallel, elongated gold conductors 15 and 16, respectively, are printed or deposited. The two sets of conductors 15 and 16 are orthogonal to each other to achieve maximum flexibility of connections between containers 14, each of which contains a separate circuit to be interconnected.

Figure 2:
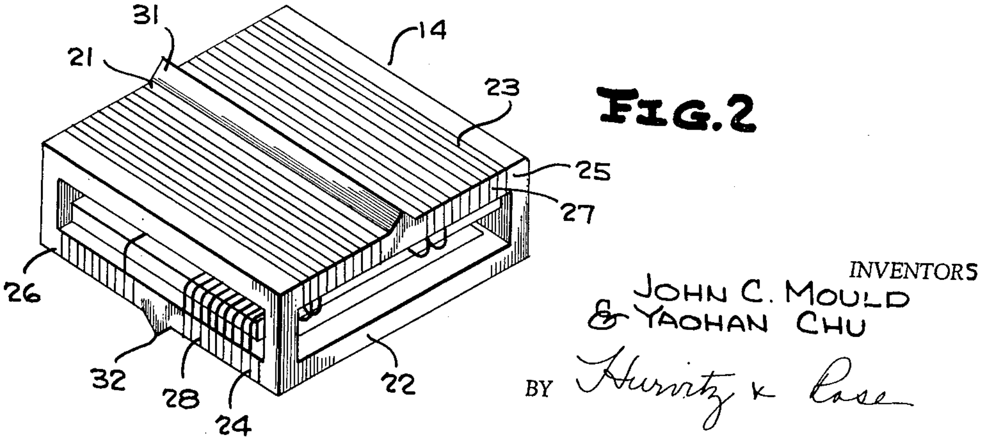
FIGURE 2 is a perspective view of the container employed in FIGURE 1 showing the connections between circuit element internal of the container and the conductors on the container external surfaces.

As seen from FIGURES 1 and 2, each of the hollow containers 14 includes top and bottom walls 21 and 22 having mutually insulated, parallel gold conductors 23 and 24 printed or deposited on their exterior surfaces. Conductors 23 and 24 mate with conductors 15 and 16 on the top and bottom surfaces of package 11 so that intimate physical and electrical connections are established between them. The interior and exterior surfaces of containers 14, except for conductors 23 and 24, are fabricated from an insulating material so that the containers may be placed next to each other without the possibility of short circuits.

Along the edges 25 and 26 of container 14 adjacent to and co-extensive with conductors 23 and 24, further parallel conductors 27 and 28, which are extensions of conductors 23 and 24, are provided. Conductors 27 and 28 are soldered or welded to leads 29 which extend orthogonally from substrate board 31.

Substrate wafer 31 is a glass or ceramic material having conductors, terminal lands and resistors deposited thereon as well as diodes and transistors secured thereto in a known manner. It is to be understood that the circuit element may also consist of a molecular electronic unit having a germanium wafer upon which transistors, diodes and resistors are diffused. If desirable, the entire element may be potted so that the orthogonal conductors can be deposited on the potting exterior, thereby eliminating the need for the hollow containers.

The containers 14 are maintained in a fixed position relative to the cover 12 and base 13 by ridges 31 and 32 on their top and bottom walls which engage grooves 33 and 34 in the package walls 12 and 13. Wedges 31 and 32 bisect the container side on which they are located and run parallel to conductors 23 and 24 on the respective container walls. Grooves 32 and 33 run parallel to conductors 15 and 16, respectively, and are separated from each other by a distance equal to the center separation of containers 14. Thereby, grooves 33 and 34 mate with ridges 31 and 32, respectively, and the possibility of container movement is almost eliminated when cover 12 is placed on base 13 due to the orthogonal wedge relation.

To seal containers 14 in place and insure contact between conductors 15 and 22 as well as 16 and 23, a vacuum chamber is formed within package 11. A vacuum seal is established by flange 35 on cover 12 mating with sealing wedge 37 on the vertical wall 38 of base 13. After cover 12 has been placed on base 13, air is withdrawn from the interior of package 11 by connecting a vacuum pump to valve 39. The partial vacuum inside package 11 results in atmospheric pressures being applied against the exterior walls which are flexed so that the matching grooves 33 and 34 and wedges 31, 32 are securely fastened. Also, a vacuum inside of package 11 reduces the possibility of contact surface contamination due to oxidation.

Once the cover is closed, input and output signals are coupled to the containers via connector 41 which has its individual elements soldered to conductors 16. These are the only connections necessary between the elements within package 11 and circuitry external thereto.

In response to input pulses applied to the elements in connector 41 conduction paths are established along selected conductors 16 and 24 on the underside of containers 14. Any of the containers having internal circuit elements connected to the selected conductors generates an output pulse on selected conductors 23 in accordance with its preprogrammed circuit configuration and the input. The output pulse is coupled along the conductor 15 mated with the activated conductor 23. The pulse on conductor 15 is coupled as an input to another of the container circuits via the conductor 23 mated with it. The other container circuit derives an output at one of its bottom conductors 24 which is coupled as an output to terminal connector 41 via one of the conductors 16.

For digital computer type circuits this system enables multiple operations to be performed on a signal with minimum of effort in connecting the various circuit elements together. The use of conductors on the top and bottom of each container results in system flexibility since the same type of container can be utilized to receive an externally or internally derived signal. If a program change or a component malfunction occurs, it is merely necessary to open package 11, by removing cover 12, and replace the selected containers as required.

To prevent the spurious application of external pulses to the circuits within containers 14, the external surface of package 11 is an electrically conductive shielding film.

The small size achieved with the present invention is apparent when it is realized that a complete digital computer arithmetic unit is obtained with a package having a length of 5", a width of 3" and a height of ½". Each of the twenty-four containers (6 x 4) is ¾" on its top and bottom sides and has a height of ⅜" and the conductor density is twenty per inch.

Figure 3:
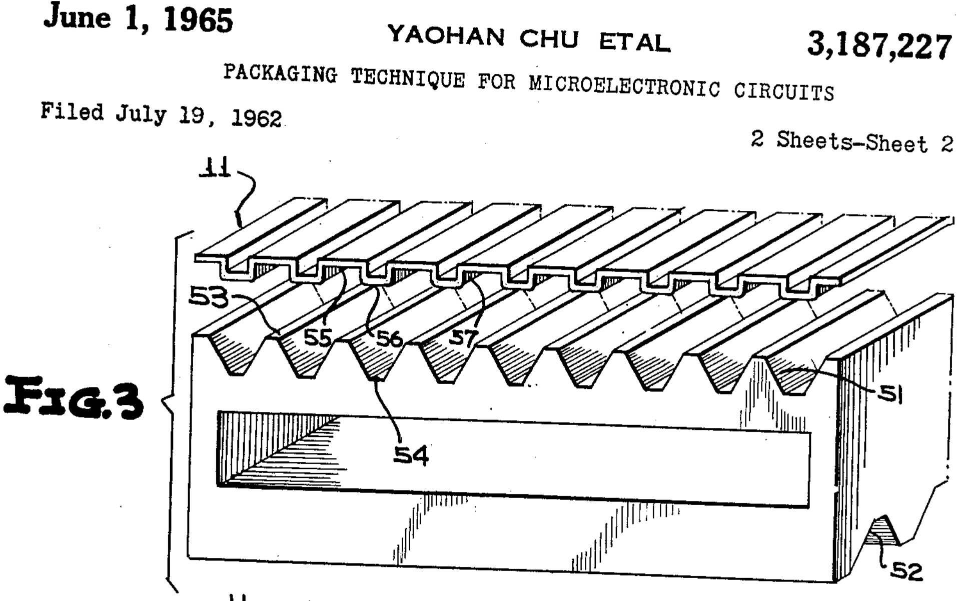
FIGURES 3 and 4 are perspective views of a modification of the container and panel board of FIGURE 1.
Figure 4:
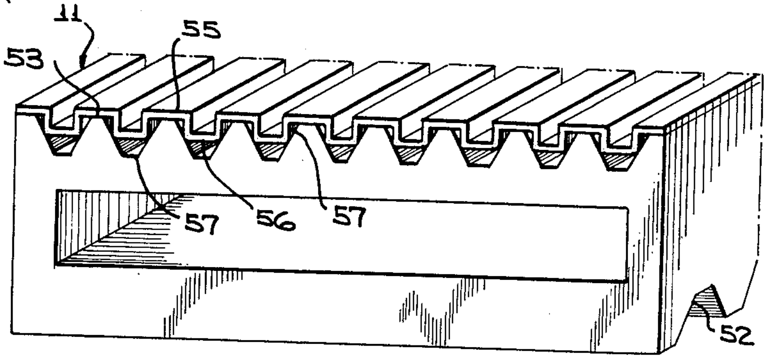

Reference is now made to FIGURES 3 and 4 which are illustrations of an alternative embodiment of a container and its co-operating top which does not require a vacuum to maintain the elements in a fixed position. In this embodiment, the top and bottom surfaces of container 14 are corrugated with truncated saw teeth 51 and 52, upon which are deposited a conductive film. Adjacent ones of teeth 51 and 52 are connected together by electrically insulating lands 53 and grooves 54 located between their apices and bases. Lands and grooves 53 and 54 on the top of container 14 extend parallel to each other but orthogonally to the lands and grooves on the bottom of the container.

To fix the container in place, the top and bottom interior surfaces of package 11 are corrugated rectangularly. The internal, electrically insulated, corrugation surface 55 mates with lands 53 when the container 14 is properly located in base 13 and cover 12 is closed, as seen in FIGURE 4. Under these conditions, the corners formed by the intersections of external corrugated surfaces 56 and walls 57 between surfaces 55 and 56 are wedged into the sides of teeth 51. This arrangement results in considerably greater contact pressure than is attained with the wedges and grooves of FIGURES 1 and 2 so that the need for a vacuum chamber is obviated.

To provide electrical connections between the various containers the corrugation side walls 57 and a small segment of surfaces 56 have deposited thereon a conductive film. Thereby, electrical contact is established between conductive teeth 51 and 52 and side walls 57 in a similar manner as connections are maintained by conductors 15, 16, 23 and 24 of FIGURES 1 and 2. By sliding the conducting surfaces 51 and 57 relative to each other, the matching contacts are cleaned so that the possibility of system failure due to faulty circuit connection is substantially obviated.

Figure 5:
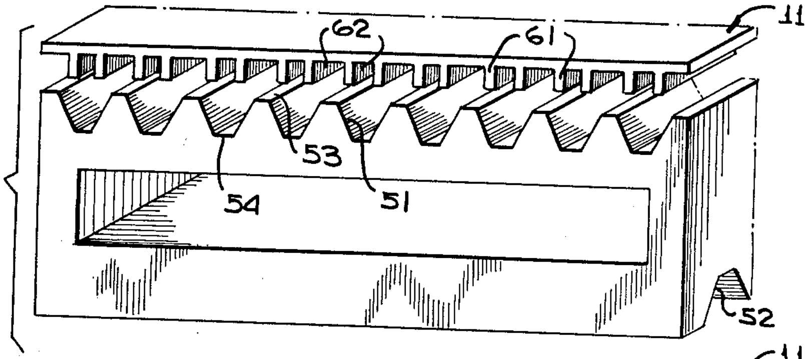
FIGURES 5 and 6 are perspective views of another modification of the container and panel board of FIGURE 1.
Figure 6:
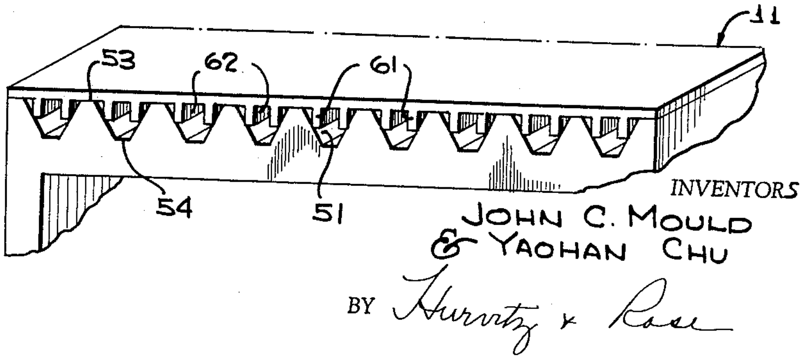

Reference is now made to FIGURES 5 and 6 which illustrate a further embodiment of the invention. In this embodiment, the containers are fabricated exactly as those in the embodiment of FIGURES 3 and 4. However, the corrugation in the package cover and base consists of ribs 61 which extend into teeth 51 when the containers are in place and the cover is closed. Both side walls 62 of each rib are coated with a conductive material so that contact between the conducting teeth surfaces is attained.

This embodiment, in addition to attaining a sufficient pressure bond between the conducting surfaces, permits great flexibility in connecting the containers to the package conductors. This is because saw teeth 51 may be interconnected with any of the ribs as desired. There are no limitations to the relative package and container conductors positions other than alignment, in distinction to the other embodiments in which there must be a mating of the conductors and the mechanical attaching means.

While we have described and illustrated several specific embodiments of our invention, it will be clear that variations of the details of construction which are specifically illustrated and described may be resorted to without departing from the true spirit and scope of the invention as defined in the appended claims.

We claim:

1. A system for interconnecting a plurality of individual circuits comprising a first set of mutually insulated, elongated, conductors, a second set of mutually insulated elongated conductors spaced from said second set of conductors, said first and second sets of conductors being oriented at a predetermined angle greater than zero, a plurality of containers each containing one of said circuits, said containers extending in a two dimensional array wherein a plurality of containers is disposed in each dimension of said array, said containers including a pair of opposed sides in contact with and fitting between said sets of conductors, each of said sides including a plurality of mutually insulated, elongated conductors on the external portions thereof, the conductors on said containers being connected to the circuit within its respective container and to the set adjacent thereto, the conductors on one side being oriented at said angle to the conductors on the other side and mated with the conductors in said sets, said first and second sets of conductors extending between a plurality of said containers, and means for maintaining said containers and the conductors in said planes in fixed relation.

2. A system for interconnecting a plurality of individual circuits comprising a first set of mutually insulated, elongated, conductors, a second set of mutually insulated elongated conductors spaced from and orthogonal to said first set of conductors, a plurality of containers each containing one of said circuits, said containers extending in a two dimensional array wherein a plurality of containers is disposed in each dimension of said array, said containers including a pair of opposed sides in contact with and fitting between said sets of conductors, each of said sides including a plurality of mutually insulated, elongated conductors on the external portions thereof, the conductors on said containers being connected to the circuit within its respective container and to the set adjacent thereto, the conductors on one side being orthogonal to the conductors on the other side and mated with the conductors in said sets, said first and second sets of conductors extending between a plurality of said containers, and means for maintaining said containers and the conductors in said planes in fixed relation.

3. The system of claim 2 wherein said means for maintaining includes first corrugated surfaces on both of said sides, said first corrugated surfaces mating with second corrugated surfaces upon which said conductor sets are positioned, the corrugated surfaces on one of said sides being orthogonally oriented to the corrugated surfaces on the other of said sides.

4. The system of claim 3 wherein the first corrugated surfaces have a truncated sawtooth form and said container conductors are formed on the sloping portions of said sawtooth.

5. The system of claim 4 wherein the second corrugated surfaces have rectangular forms, and said container conductors are formed on the side walls of said form.

6. The system of claim 4 wherein the second corrugated surfaces include a plurality of ribs, and said container conductors are formed on the side walls of said ribs.

7. The system of claim 2 wherein said means for maintaining includes mating grooved and wedged surfaces interspersed between said conductors.

8. The system of claim 7 wherein said means for maintaining includes a vacuum chamber in which said conductors and containers are positioned.

9. A system for interconnecting a plurality of individual circuits comprising a first base plate carrying a first set of mutually insulated, parallel, conductors, the longitudinal axes of the conductors of said first set being substantially parallel, a second base plate carrying a second set of mutually insulated elongated conductors, the longitudinal axes of the conductors of said second set being substantially parallel, said first and second sets of conductors being oriented at a predetermined angle greater than zero, said second set of conductors being spaced from said first set of conductors, a plurality of containers each containing one of said circuits, said containers being arranged in a two dimensional array wherein a plurality of containers is disposed in each dimension of said array, said containers including a pair of opposed sides fitting in contact with and between said sets of conductors, each of said sides including a plurality of mutually insulated, elongated conductors on the external portions thereof, the conductors on said containers being connected to the circuit within its respective container and to the conductors of the set adjacent thereto, the conductors on one side being oriented at said angle to the conductors on the other side, the conductors on each side of said containers being mated with the conductors in the set adjacent thereto, the conductors of said first and second sets extending between a plurality of said containers, and means for maintaining said containers and the sets of conductors in fixed relation.

10. A system for interconnecting a plurality of individual circuits comprising a first base plate carrying a first set of mutually insulated, elongated, conductors, the longitudinal axes of the conductors of said first set being substantially parallel, a second base plate carrying a second set of mutually insulated elongated conductors, the conductors of the second set being spaced from and orthogonal to said first set of conductors, the longitudinal axes of the conductors of said second set being substantially parallel, a plurality of containers each containing one of said circuits, said containers being arranged in a two dimensional array wherein a plurality of containers is disposed in each dimension of said array, said containers including a pair of opposed sides in contact with and fitting between said sets of conductors, each of said sides including a plurality of mutually insulated, elongated conductors on the external portions thereof, the conductors on said containers being connected to the circuit within its respective container and to the conductors of the set adjacent thereto, the conductors on one side being orthogonal to the conductors on the other side and mated with the conductors in the set adjacent thereto, the conductors of said first and second sets extending between a plurality of said containers, and means for maintaining said containers and the conductors in said planes in fixed relation.

11. The system of claim 10 wherein said first and second conductor sets lie in substantially parallel planes.

12. The system of claim 2 further wherein said system includes a single connector, said connector being connected to the conductors of only one of said sets of conductors.

13. The system of claim 9, wherein said first and second conductors sets lie in substantially parallel planes.

References Cited by the Examiner

UNITED STATES PATENTS

| | | | |
|---|---|---|---|
| 2,752,537 | 6/56 | Wolfe | 317—101 |
| 2,841,660 | 7/58 | Tabet | 317—101 |
| 2,898,522 | 8/59 | Handen | 339—17 |
| 2,907,926 | 10/59 | Slack | 339—17 |

OTHER REFERENCES

Electronic Design, Vol. 8, No. 23, pp. 84, 85, November 9, 1960.

JOHN F. BURNS, *Primary Examiner.*